United States Patent [19]

Jeon et al.

[11] Patent Number: 5,673,363
[45] Date of Patent: Sep. 30, 1997

[54] ERROR CONCEALMENT METHOD AND APPARATUS OF AUDIO SIGNALS

[75] Inventors: Byeungwoo Jeon, Sungnam; Jechang Jeong, Seoul, both of Rep. of Korea

[73] Assignee: Samsung Electronics Co., Ltd., Kyungki-Do, Rep. of Korea

[21] Appl. No.: 575,522

[22] Filed: Dec. 20, 1995

[30] Foreign Application Priority Data

Dec. 21, 1994 [KR] Rep. of Korea .................. 94-35702

[51] Int. Cl.$^6$ .................. G10L 5/02; G10L 3/00
[52] U.S. Cl. .................. 395/2.79; 395/2.74; 395/2.37; 395/2.14; 395/2.15; 371/4; 371/7
[58] Field of Search .................. 395/2.79, 2.74, 395/2.37, 2.14; 371/4, 7

[56] References Cited

PUBLICATIONS

Plenge et al, Combined Channel Coding and Concealment, IEE Colloquiem Feb. 17, 1993.
Muller and Wachter, A Codec Candidate for the GSM Half Rate Speech, ICASSP Apr. 19, 1994.

*Primary Examiner*—Allen R. MacDonald
*Assistant Examiner*—Robert Sax
*Attorney, Agent, or Firm*—Sughrue, Mion, Zinn, Macpeak & Seas, PLLC

[57] ABSTRACT

An apparatus for concealing a frame or multiple of frames where errors have occurred in a digital audio signal which is subband coded and transform coded in units of an error-correctable frame is described. The error concealment apparatus includes an error detector for receiving frequency coefficients representing the encoded digital audio signal and detecting whether an error has occurred for each frame, and a decoder for decoding the frequency coefficients by respective subbands to form a frequency domain of the whole audio signal with respect to the input frequency coefficients. A buffer stores the frequency coefficients decoded by said decoder. Frequency coefficients of a frame or multiple of frames where errors have occurred are reconstructed using predetermined weight values and frequency coefficients of adjacent frames which do not have errors. Once reconstructed, the newly constructed frequency coefficients of the error frames are stored in the buffer also as to update the decoded coefficients stored therein corresponding to the error frames. The contents of the buffer are sent to a synthesis filter bank for converting the frequency coefficients into an audio signal of a time domain, in the same sequence as a decoding sequence.

19 Claims, 5 Drawing Sheets

ERROR-OCCURRENCE INTERVAL

ERROR CONCEALMENT METHOD AND APPARATUS OF AUDIO SIGNALS

BACKGROUND OF THE INVENTION

The present invention relates to a digital audio receiving apparatus for decoding a compressed audio signal, and more particularly, to an error concealment method and apparatus of an audio signal in which when a particular frame of the compressed audio signal is erroneously lost, the lost frame can be concealed using an adjacent frame or multiple frames of the audio signal.

A subband coding and a transform coding are generally used to compress an audio signal. A conventional digital audio signal encoding/decoding apparatus using a subband coding is schematically shown in FIG. 1. In FIG. 1, an analysis filter bank 1A within an encoder 1 divides an input audio signal into K frequency bands. Down-sampling blocks 1B down-sample or decimate each divided frequency band signal into 1/K times a sampling frequency of the input audio signal. Quantization blocks 1C quantize the sampled signal. The quantized signals are transmitted to a receiving end in units of a frame. Then, a decoder 2 of the receiving end reproduces an original audio signal through an inverse signal processing procedure of the encoder 1.

The apparatus of FIG. 1 processes the audio signal in units of a frame. The frame is the minimum unit which can detect an error generated in the audio signal during the transmission of the compressed audio signal. When the number of the samples in s frame of the audio signal is N, analysis filter bank 1A divides the one frame samples into K subbands. Each down-sampling block 1B down-samples (or decimates) each subband signal into 1/K times a sampling frequency. Accordingly, a total m(=N/K) samples (or frequency coefficients) exist for every frame with respect to one subband. When a set of all frequency coefficients in the same time is a "segment," one frame is composed of m segments $S_1$-$S_m$ and the number of the frequency coefficients of each segment is K. The segments $S_1$-$S_m$ with respect to succeeding three frames $F_1$, $F_2$ and $F_3$ are shown in FIG. 2.

The frequency coefficients of each segment pass through inverse quantization blocks 2A, and oversampling blocks 2B for oversampling respective subband signals into K times sampling frequency, consequently to be input to a synthesis filter bank 2C, in decoder 2. Synthesis filter bank 2C inversely transforms the input frequency coefficients into signals in a time domain, and then multiplied by a given windowing function. Therefore, the audio signal in the time domain which is reconstructed at a certain time can be obtained by a total sum of values of the inversely transformed signal from all segments multiplied by the windowing function at a corresponding point of time. Here, the windowing function is used to reduce discontinuities between edges of the succeeding frames. On example of the windowing function is shown in FIG. 2. Due to the use of such a windowing function, the audio signal of the reconstructed one frame is influenced by the frequency coefficients of each segment of a previous frame and a following frame.

A conventional error concealment apparatus is shown in FIG. 3, which prevents a signal from being lost when an error occurs in one frame. The FIG. 3 apparatus performs error concealment with respect to the audio signal compressed by a subband coder or a transform coder. The operation of the FIG. 3 apparatus will be described below with reference to FIGS. 4A–4C.

A decoder 20 decodes a received compressed audio signal, and an error detector 10 performs error detection in units of a frame. Decoder 20 is composed of an inverse quantizer, an oversampler and a synthesis filter bank, in the same manner as that of decoder 2 in FIG. 1. The audio signal output from decoder 20 is applied to a switch 30. The audio signal of the previous frame stored in a frame buffer 40 is also applied to switch 30. Switch 30 selects the signal from decoder 20 or frame buffer 40 according to a control signal output from error detector 10 and supplies the selected signal to frame buffer 40. In case of the frame where an error has not been detected, error detector 10 controls switch 30 so that the signal from decoder 20 is applied to frame buffer 40. Otherwise, when an error is detected, error detector 10 controls switch 30 so that the signal is fed back from the output of frame buffer 40 to be supplied to the input of frame buffer 40. For example, when a frame $F_2$ among three frames $F_1$, $F_2$ and $F_3$ shown in FIG. 4A can not be reconstructed properly due to an error, error detector 10 controls switch 30 so that the signal fedback from frame buffer 40 is again supplied to frame buffer 40. The audio signal output from frame buffer 40 is converted into an analog signal by digital-to-analog converter (DAC) 50.

Concerning the cases where the error occurs and does not occur, the signals which are finally reproduced by the FIG. 3 error concealment apparatus are shown in FIG. 4B. Since continuities between the adjacent frames are maintained by using the windowing function shown in FIG. 4C, the signal represented by a dotted line becomes the finally reproduced signal with respect to frames $F_2$ and $F_3$ of FIG. 4B were frame $F_2$ to be properly reconstructed. On the other hand, when frame $F_2$ is not properly reconstructed due to an error, frame $F_2$ is replaced by an audio signal of previous frame $F_1$ shown in FIG. 4B. The signal which is finally determined with respect to frame $F_2$, in the error case, is shown as a solid line in FIG. 4B. As can be seen from FIG. 4B, although an error does not occur in frame $F_3$, the audio signal is influenced by frame $F_2$ in which an error has occurred. The reason is because decoder 20 uses a windowing function of frame $F_2$ represented as a dotted line in FIG. 4C in the audio signal of frame $F_2$ in which an error has occurred, and processes the compressed audio signal of frame $F_3$ so that continuities between the audio signal of the frame $F_2$ in this manner and that of the following frame $F_3$ are maintained. Thus, the reproduced audio signal of frame $F_3$ becomes a signal represented as a solid line in FIG. 4B. This signal shows a remarkable difference from a waveform shown as a dotted line, that is, a reproduced signal of frame $F_3$ when an error does not occur in frame $F_2$. Therefore, it is not proper that a signal of frame $F_2$ which is not reconstructed due to error occurrence is concealed by simply reproducing the previous frame $F_1$. Moreover, when the audio signal of frame $F_2$ varies much differently from frame $F_1$, signal reproduction of a total frame is not much further proper.

SUMMARY OF THE INVENTION

Therefore, to solve the above problems, it is an object of the present invention to provide an error concealment method of an audio signal which can effectively reconstruct frequency coefficients of a frame where an error has occurred using frequency coefficients of contiguous frame or frames.

Another object of the present invention is to provide an apparatus for embodying the above method.

Thus, to accomplish the above object of the present invention, there is provided a method for concealing a frame where an error has occurred in a digital audio signal which is subband coded and transform coded in units of an error-correctible frame, the error concealment method comprising the steps of:

(a) receiving frequency coefficients representing the encoded digital audio signal;

(b) detecting whether an error has occurred for each frame with respect to the input frequency coefficients;

(c) decoding the frequency coefficients by respective subbands forming a frequency domain of the whole audio signal with respect to the input frequency coefficients;

(d) storing the frequency coefficients decoded in step (c);

(e) reconstructing the frequency coefficients of a frame where errors have occurred using predetermined weight values and frequency coefficients of frame or multiple of frames adjacent to the frame where the error has occurred, in response to the error detection result in step (b);

(f) replacing the frequency coefficients of the frame where the error has occurred, by the frequency coefficients reconstructed in step (e); and (g) converting the frequency coefficients resulting from step (f) into an audio signal of a time domain, in the same sequence as that decoding in step (c).

The other object of the present invention can be accomplished by providing an apparatus for concealing a frame where an error has occurred in a digital audio signal which is subband coded and transform coded in units of an error-correctible frame, the error concealment apparatus comprising:

error detection means for receiving frequency coefficients representing the encoded digital audio signal and detecting whether an error has occurred for each frame;

decoding means for decoding the frequency coefficients by respective subbands forming a frequency domain of the whole audio signal with respect to the input frequency coefficients;

buffer means for storing the frequency coefficients decoded by said decoding means;

frequency coefficient reconstruction means for reconstructing the frequency coefficients of a frame where an error has occurred using predetermined weight values and frequency coefficients for each subband adjacent to the frame where the error has occurred among the frequency coefficients belonging to a frame which is stored in said buffer means and is adjacent to the frame where the error has occurred, and updating the frequency coefficients of the frame where the error has occurred and is stored in said buffer means, in response to the error detection result from error detection means; and a synthesis filter bank for receiving the frequency coefficients stored in said buffer means and converting the frequency coefficients into an audio signal of a time domain, in the same sequence as a decoding sequence.

BRIEF DESCRIPTION OF THE DRAWINGS

The preferred embodiments are described with reference to the drawings wherein.

DETAILED DESCRIPTION OF THE PREFERRED EMBODIMENT

Preferred embodiments of the present invention will be described below in more detail with reference to the accompanying drawings FIGS. 5 through 8B.

Figure 1:
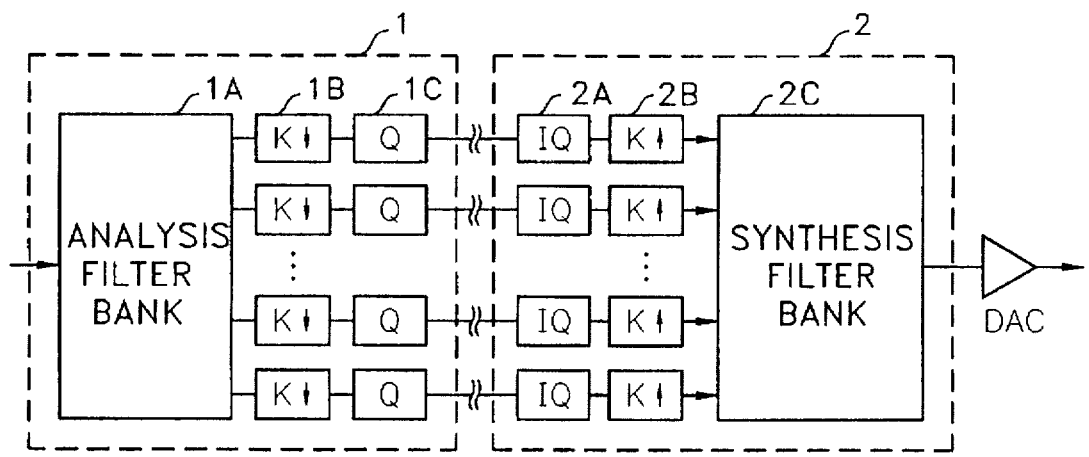
FIG. 1 is a schematic block diagram of a conventional digital audio signal encoding/decoding apparatus using a subband coding method.
Figure 2:
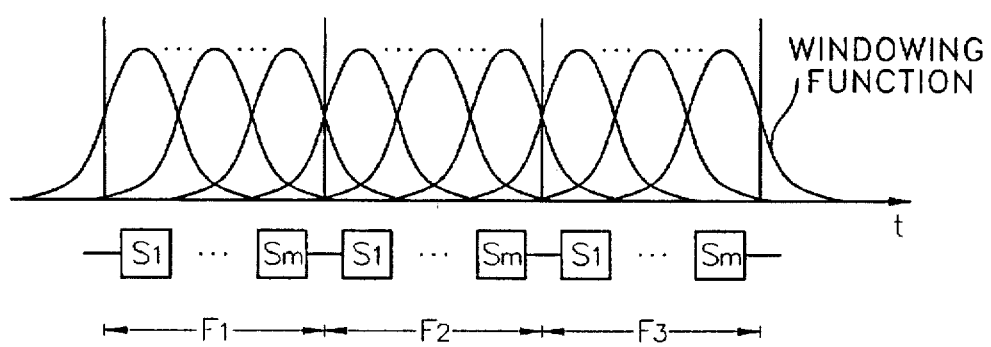
FIG. 2 is a graphical view for explaining a digital audio signal.
Figure 3:
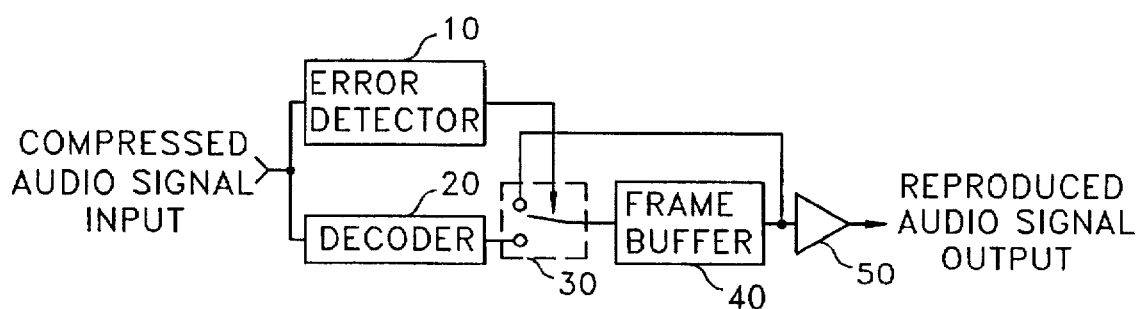
FIG. 3 is a block diagram showing a conventional error concealment apparatus for a digital audio signal.
Figure 4A:
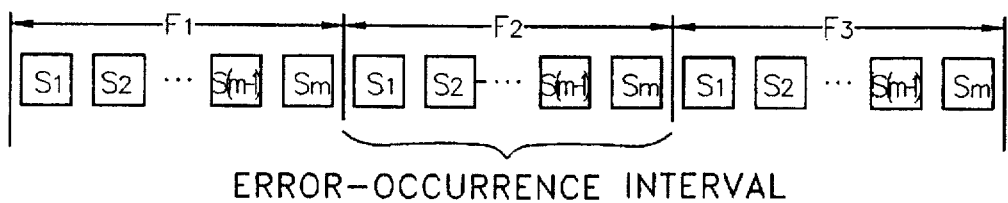
FIGS. 4A–4C are waveform diagrams for explaining error concealment in the FIG. 3 apparatus.
Figure 4B:
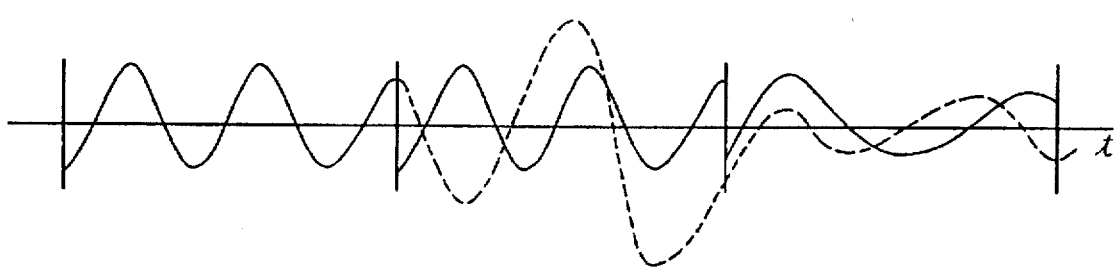
Figure 4C:
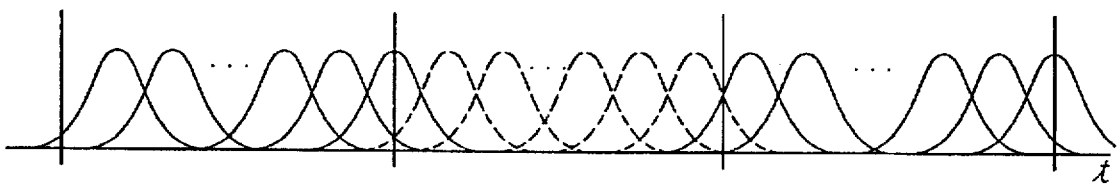
Figure 5:
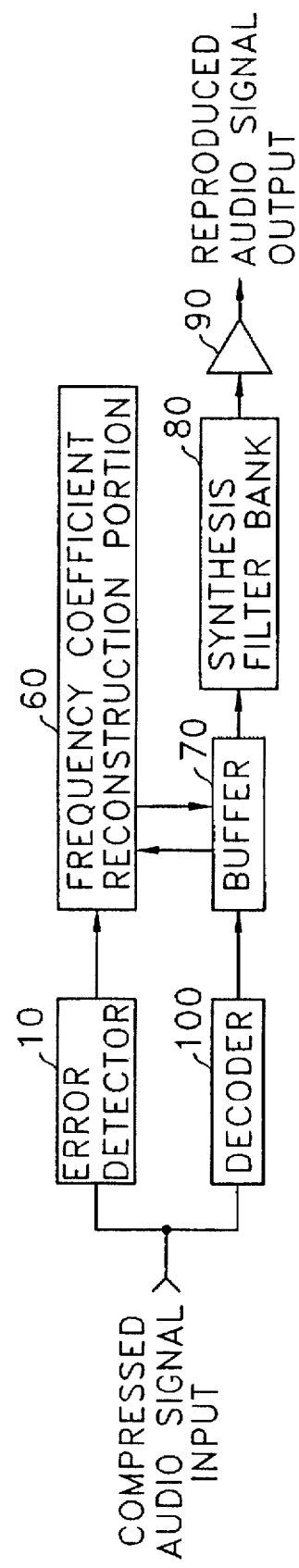
FIG. 5 is a block diagram showing an error concealment apparatus of a digital audio signal according to a preferred embodiment of the present invention.

The FIG. 5 apparatus reconstructs an audio signal compressed by the block such as encoder 1 in FIG. 1 for a digital audio signal. An error detector 10 detects whether an error has occurred for each frame of the input compressed audio signal, and generates an error frame indication signal representing that a frame can not be reconstructed due to an error. A decoder 100 decodes the compressed audio signal in a frequency domain. With respect to the audio signal compressed by encoder 1 of FIG. 1, the signal input to decoder 100 becomes frequency coefficients of respective subbands. In this case, decoder 100 generates inversely quantized frequency coefficients. The output signal of decoder 100 is supplied to a buffer portion 70. Buffer portion 70 stores the frequency coefficients. A capacity of storing the data in buffer portion 70 is determined by which method the FIG. 5 apparatus is designed among error concealment methods explained with reference to FIGS. 6A, 6B, 8A and 8B. Frequency coefficient reconstruction portion 60 reads out a signal which is stored in buffer portion 70 according to the error frame indication signal from error detector 10, and reconstructs the frequency coefficients of the frame where an error has occurred, according to a method to be described later. As a result, the frequency coefficients of the error-containing frame are reconstructed by frequency coefficient reconstruction portion 60. The reconstructed frequency coefficients are applied to buffer portion 70. The frequency coefficients of the error-containing frame which is decoded by decoder 100 in buffer portion 70 are replaced by corresponding frequency coefficients reconstructed by frequency coefficient reconstruction portion 60. Buffer portion 70 outputs the stored frequency coefficients in sequence matching a frame sequence to synthesis filter bank 80. Synthesis filter bank 80 multiplies the frequency coefficients of each frame supplied from buffer portion 70 by a windowing function, and transforms the resultant signal into a signal in a time domain. A digital-to-analog converter (DAC) 90 converts the signal applied from synthesis filter bank 80 into an analog signal. Therefore, the output signal from DAC 90 becomes a reproduced audio signal in which the generated error is concealed.

Figure 6A:
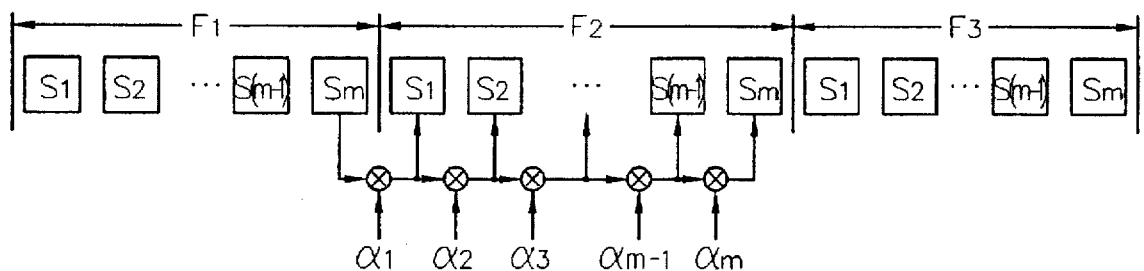
FIGS. 6A and 6B are conceptual diagrams for explaining a signal processing of a frequency coefficient reconstruction portion according to the error concealment method provided in the present invention.

An operation of frequency coefficient reconstruction portion according to the methods proposed by the present invention, will be described below with reference to FIGS. 6A and 6B. The error concealment method shown in FIGS. 6A and 6B reconstructs the frequency coefficients of each segment in a frame where an error has occurred, using a frequency coefficient of the last segment of a previous frame. With respect to the subband coded audio signal, frequency coefficient reconstruction portion 60 reconstructs the frequency coefficients of the error-containing frame by the respective subbands. FIG. 6A shows a case where one frame $F_2$ is not decoded due to an error. In this case, a value of the frequency coefficient of a first segment $S_1$ in frame $F_2$ becomes a value obtained by multiplying the frequency coefficient of the M-th segment $S_m$, being the last segment in frame $F_1$ by weight value $\alpha_1$. A coefficient of second segment $S_2$ is obtained by multiplying a coefficient of first segment $S_1$ by weight value $\alpha_2$. The following segments $S_3$–$S_m$ are processed in the same manner as the above. Thus, the frequency coefficients of the whole segments $S_1$–$S_m$ belonging to frame $F_2$ where an error has occurred are reconstructed. Here, weight values $(\alpha_1, \alpha_2, \ldots, \alpha_m)$ are positive numbers which are generally less than or equal to one and can be determined by a user. For example, if $\alpha_1 = \alpha_2, \ldots, \alpha_m = \alpha < 1.0$, the frequency coefficients of respective segments $S_1$–$S_m$ within frame $F_2$ are obtained by the following expressions.

$$\text{Coefficient } (S_1, F_2) \Longleftarrow \alpha \times (S_m, F_1)$$

$$\text{Coefficient } (S_2, F_2) \Longleftarrow \alpha^2 \times (S_m, F_1)$$

.
.
.

$$\text{Coefficient } (S_m, F_2) \Longleftarrow \alpha^m \times (S_m, F_1)$$

Figure 7:
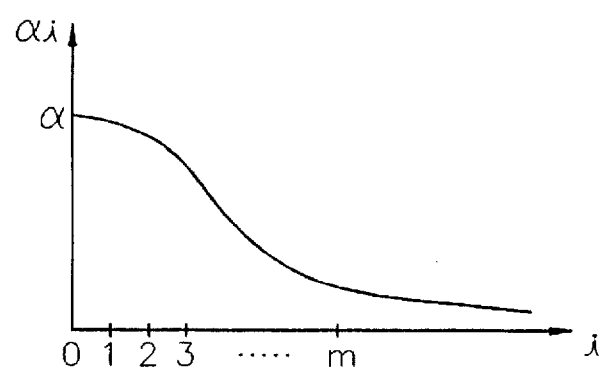
FIG. 7 is a graphical view showing one example of a weight value $\{\alpha_i\}$ by which a frequency coefficient is multiplied.

Here, coefficient $(S_j, F_i)$ represents a frequency coefficient belonging to the j-th segment of the i-th frame. At this time, since weight value $\alpha$ is smaller than one, the farther along in time the segment is located in one frame, the more sharply the frequency coefficient value is lowered. Such an example is shown in FIG. 7.

Figure 6B:
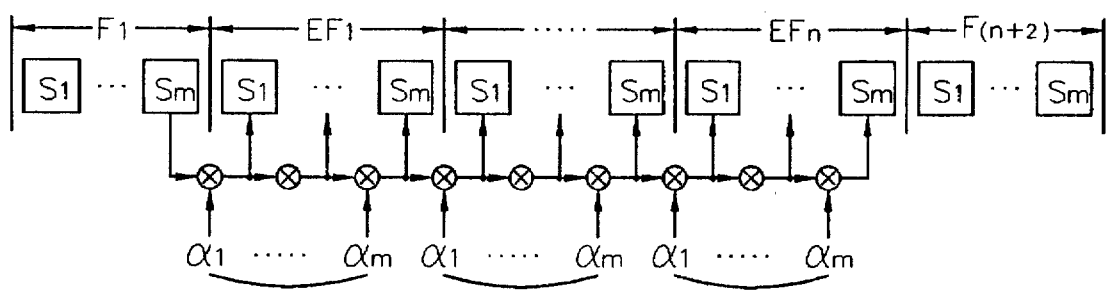

As shown in FIG. 6B, when succeeding errors occur in several contiguous frames $EF_1, EF_2, \ldots, EF_n$, the frequency coefficient of the last segment in frame $F_1$ where an error does not occur, is used to reconstruct the frequency coefficients of all frames $EF_1, EF_2, \ldots, EF_n$ which are located succeedingly. To reconstruct the frequency coefficients of frames $EF_1, EF_2, \ldots, EF_n$, a method similar to that explained with reference to FIG. 6A is applied. As a result, the frequency coefficient value of the m-th segment $S_m$ in last frame $EF_n$ becomes a value obtained by multiplying the previous weight values in all the error-containing frames. It is preferable in this case that the different weight values can be used in the respective error-generated frames $EF_1, EF_2, \ldots, EF_n$. For example, the following expressions can be given.

$$EF_1 \Longleftarrow \alpha_1 = 0.9, \alpha_2 = \ldots \alpha_m = 1$$

$$EF_2 \Longleftarrow \alpha_1 = 0.8, \alpha_2 = \ldots \alpha_m = 1$$

$$EF_3 \Longleftarrow \alpha_1 = 0.6, \alpha_2 = \ldots \alpha_m = 1$$

.
.
.

$$EF_{(n-1)} \Longleftarrow \alpha_1 = 0.1, \alpha_2 = \ldots \alpha_m = 1$$

-continued $$EF_n \Longleftarrow \alpha_1 = \alpha_2 = \ldots \alpha_m = 0$$

When the weight values are assigned in this way, the frequency coefficient of first segment $S_1$ in first error-containing frame $EF_1$ shown in FIG. 6B is obtained by multiplying the coefficient value of m-th segment $S_m$ in previous frame $F_1$ by weight value $\alpha_1$ (=0.9). Likewise, the frequency coefficient values of second segment $S_2$ in first error-containing frame $EF_1$ is obtained by multiplying the first coefficient values by weight value $\alpha_2$. Thus, up to the (n−1)-th error-containing frame $EF_1$–$EF_{(n-1)}$, a reproduced signal is made using a reconstructed frequency coefficient of the previous frame. However, since the weight values of the n-th error-generated frame are all zeros, this interval becomes an audio erasure state. That is, if the weight value is properly adjusted in this manner, an audio muting operation can be performed from any frame.

The above-described method according to the present invention reconstructs the error using the last segment in the previous frame prior to error occurrence, for more convenient explanation. It is however possible to use a coefficient of a different segment which is located near the last segment of the previous frame or future frame.

Figure 8A:
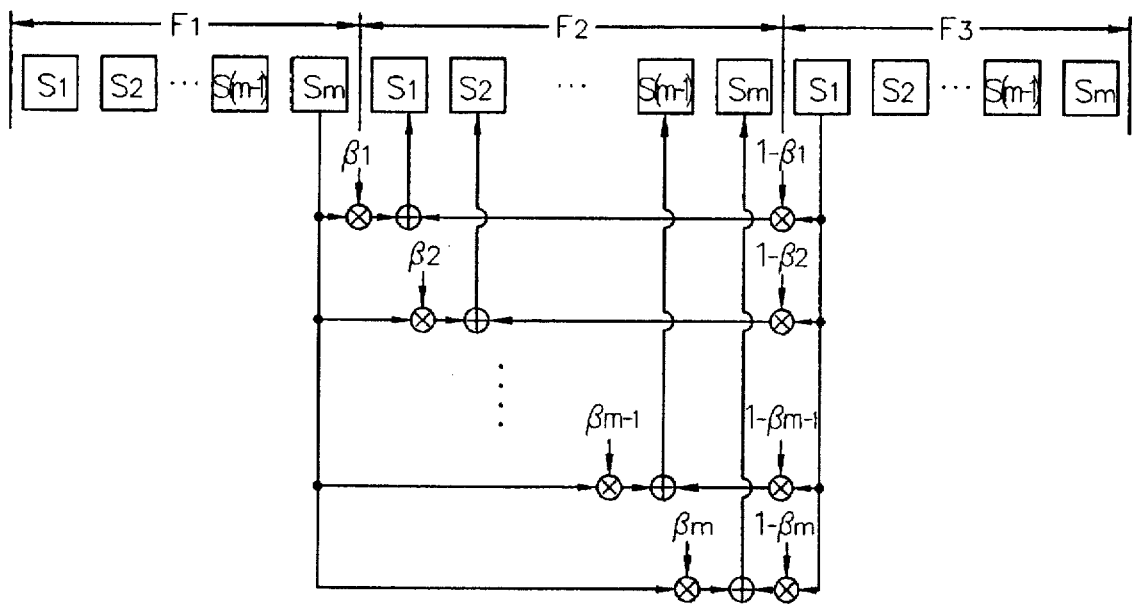
FIGS. 8A and 8B are conceptual diagrams for explaining a signal processing of a frequency coefficient reconstruction portion according to another error concealment method provided in the present invention.
Figure 8B:
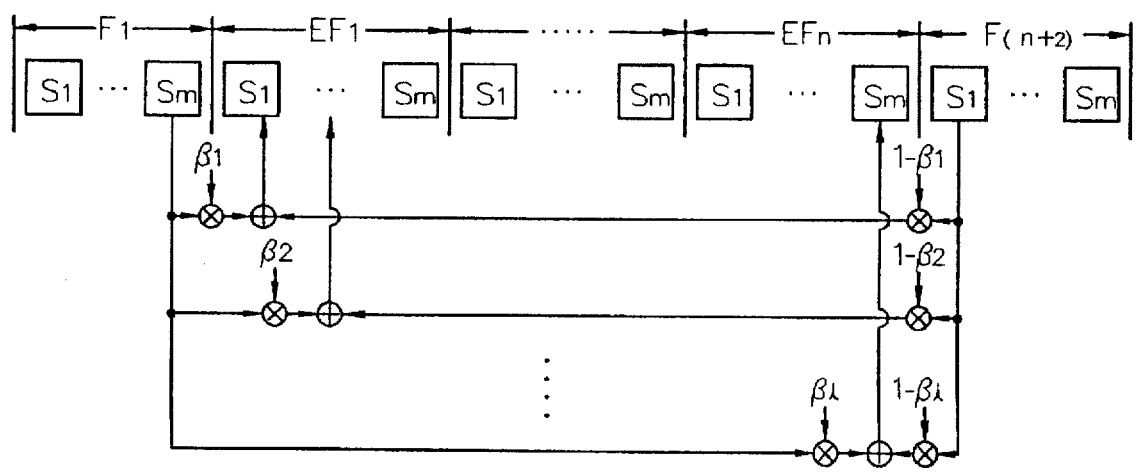

FIGS. 8A and 8B are views for explaining a new error concealment method modifying the error concealment method explained with reference to FIGS. 6A and 6B. The error concealment method proposed in connection with FIGS. 8A and 8B calculates the frequency coefficients of the frame where the error has occurred, through an interpolation operation using a frequency coefficient of the previous frame with respect to the error-containing frame and the frequency coefficient of the following frame with respect to the error-containing frame. The method for calculating the frequency coefficient values of error-containing frame $F_2$ will be described below. In case of FIG. 8A, the frequency of first segment $S_1$ in frame $F_2$ is obtained by adding a value of a coefficient value of m-th segment $S_m$ in first frame $F_1$ multiplied by weight value $\beta_1$ to a value of a coefficient value of first segment $S_1$ in third frame $F_3$ multiplied by weight value $(1-\beta_1)$. This can be represented as follows, in the general form with respect to all segments belonging to frame $F_2$.

$$\text{Coefficient}(S_1, F_2) = \beta_i \times \text{Coefficient}(S_m, F_1) + (1-\beta_i) \times \text{Coefficient}(S_1, F_3)$$

FIG. 8B shows an example where the FIG. 8A method is adapted in the case where the errors have occurred in the several contiguous frames. Since the FIG. 8B method is apparent to those having skilled in the art, through the above-described contents and FIG. 8B, the detailed description will be omitted. The weight values $\alpha_i$ and $\beta_i$ referred to in connection with FIGS. 6A, 6B, 8A and 8B can be obtained by a calculation method and can be used in the form of a look-up table.

As described above, the error concealment method and apparatus according to the present invention reconstructs the frequency coefficients of the error-containing frame using the frequency coefficient of the contiguous frame, thereby minimizing an influence on the succeeding frames due to the error-containing frame.

While only certain embodiments of the invention have been specifically described herein, it will apparent that numerous modifications may be made thereto without departing from the spirit and scope of the invention.

What is claimed is:

1. A method for concealing one or more error frames where errors have occurred in a digital audio signal, wherein the digital audio signal is subband coded and transform coded in units of error-correctable frames, said method comprising the steps of:
   (a) receiving input frequency coefficients representing the encoded digital audio signal;
   (b) detecting whether an error has occurred for each frame with respect to the input frequency coefficients, to produce an error detection result with respect to each frame;
   (c) decoding the frequency coefficients by respective subbands forming a frequency domain of the whole audio signal within each frame with respect to the input frequency coefficients;
   (d) storing the frequency coefficients decoded in step (c);
   (e) reconstructing the frequency coefficients of one or more error frames where errors have occurred using predetermined weight values and frequency coefficients of subbands adjacent to the error frame(s) among the frequency coefficients belonging to a frame adjacent to the error frame(s), in response to the error detection result in (b);
   (f) updating the frequency coefficients of the error frame (s) stored in the step (d) with the reconstructed frequency coefficients reconstructed in step (e); and
   (g) converting the frequency coefficients resulting from step (f) into an audio signal of a time domain, in a same sequence as that of the decoding in step (c).

2. The method according to claim 1, wherein said step (e) uses frequency coefficients subbands which exist in the immediate preceding frame of the error frame(s) and is adjacent to the error frame(s).

3. The method according to claim 2, wherein said frequency coefficients belong to the last segment of the frame immediately preceding the error frame(s).

4. The method according to claim 2, wherein step (e) calculates frequency coefficients corresponding to subbands of the error frame(s), by multiplying the frequency coefficient adjacent to the error frame(s), which belongs to the immediate preceding frame for each subband, by predetermined weight values.

5. The method according to claim 4, wherein said predetermined weight values are less than or equal to one.

6. The method according to claim 1, wherein said step (e) uses frequency coefficients for subbands which exist in the immediate preceding frame and the immediate succeeding frame of the error frame(s) and are adjacent to the error frame(s), to reconstruct the frequency coefficients for each subband of the error frame(s).

7. The method according to claim 6, wherein the frequency coefficients used respectively belong to the last segment of the frame immediately preceding the error frame(s) and the first segment of the frame immediately succeeding the error frame(s).

8. The method according to claim 6, wherein said step (e) calculates frequency coefficients corresponding to subbands of the error frame(s), by multiplying the frequency coefficient adjacent to the error frame(s) which belongs to the immediate preceding frame for each subband, by a first weight value, multiplying the frequency coefficient adjacent to the error frame(s) which belongs to the immediate succeeding frame or each subband, by a second weight value, and adding the two multiplication results.

9. The method according to claim 8, wherein said first and second weight values are less than or equal to one.

10. The method according to claim 1, wherein said step (e) replaces said predetermined weight values with a value of zero to provide audio muting, when the number of the succeeding frames where errors have occurred is larger than or equal to a predetermined number.

11. An apparatus for concealing one or more error frames where errors have occurred in a digital audio signal, wherein the digital audio signal is subband coded and transform coded in units of error-correctable frames, said apparatus comprising:
   error detection means for receiving input frequency coefficients representing the encoded digital audio signal, detecting whether an error has occurred for each frame and producing an error detection result;
   decoding means for decoding the input frequency coefficients by respective subbands forming a frequency domain of the whole audio signal to provide decoded frequency coefficients;
   buffer means for storing the decoded frequency coefficients decoded by said decoding means;
   frequency coefficient reconstruction means for reconstructing frequency coefficients of the error frame(s) among frequency coefficients belonging to frames which are stored in said buffer means and are adjacent to the error frame(s) and storing the reconstructed frequency coefficients in said buffer means so as to update the decoded frequency coefficients corresponding to the error frame(s), in response to the error detection result produced by the error detection means; and
   a synthesis filter bank for receiving frequency coefficients stored in said buffer means and converting the frequency coefficients into an audio signal of a time domain, in the same sequence as a decoding sequence.

12. The apparatus according to claim 11, wherein said frequency coefficient reconstruction means uses frequency coefficients of subbands which exist in an immediate preceding frame of the error frame(s) and are adjacent to the error frame(s), to reconstruct the frequency coefficients of subbands of the error frame(s).

13. The apparatus according to claim 12, wherein said frequency coefficients to be used for reconstruction belong to the last segment of the frame which is immediately preceding the error frame(s).

14. The apparatus according to claim 12, wherein said frequency coefficient reconstruction means calculates reconstructed frequency coefficients corresponding to subbands of the error frames(s), by multiplying the frequency coefficient belonging to the last segment of the frame which is immediately preceding the one or more error frames by predetermined weight values.

15. The apparatus according to claim 14, wherein said predetermined weight values are less than or equal to one.

16. The apparatus according to claim 11, wherein said frequency coefficient reconstruction means uses frequency coefficients which exist in the immediate preceding frame and the immediate succeeding frame of the error frame(s) and are adjacent to the error frame(s), to reconstruct the frequency coefficients for subbands of the error frame(s).

17. The apparatus according to claim 16, wherein said frequency coefficients to be used for reconstruction respectively belong to the last segment of the frame which is immediately preceding the error frame(s) and the first segment of the frame immediately succeeding the error frame (s).

18. The apparatus according to claim 16, wherein said frequency coefficient reconstruction means calculates frequency coefficients corresponding to subbands of the error frame(s), by multiplying the frequency coefficient adjacent to the error frame(s) which belongs to the immediate preceding frame, for each subband, by a first weight value, multiplying the frequency coefficient adjacent to the error frame(s) which belongs to the immediate succeeding frame, for each subband, by a second weight value, and adding the two multiplication results.

19. The apparatus according to claim 18, wherein said first and second weight values are less than or equal to one.

* * * * *